(12) United States Patent
Remos

(10) Patent No.: US 10,280,634 B1
(45) Date of Patent: May 7, 2019

(54) PRODUCT LEVELING DEVICE FOR TILE MACHINES

(71) Applicant: Jorge P Remos, Miami Beach, FL (US)

(72) Inventor: Jorge P Remos, Miami Beach, FL (US)

( * ) Notice: Subject to any disclaimer, the term of this patent is extended or adjusted under 35 U.S.C. 154(b) by 0 days.

(21) Appl. No.: 16/117,007

(22) Filed: Aug. 30, 2018

(51) Int. Cl.
*E04F 21/00* (2006.01)
*E04F 21/24* (2006.01)
*E04F 15/08* (2006.01)
*E04F 15/022* (2006.01)

(52) U.S. Cl.
CPC .......... *E04F 21/241* (2013.01); *E04F 15/022* (2013.01); *E04F 15/08* (2013.01); *B32B 2419/04* (2013.01); *E04F 2201/0123* (2013.01)

(58) Field of Classification Search
CPC ............ B28B 13/0023; B28B 13/0295; B28B 13/0225; B28B 7/0041; B30B 15/304; E04F 21/241; E04F 15/022; E04F 15/08; E04F 2201/0123
See application file for complete search history.

(56) References Cited

U.S. PATENT DOCUMENTS

| | | | | |
|---|---|---|---|---|
| 2,948,043 A * | 8/1960 | Gory | ....................... | B28B 3/123 425/168 |
| 3,322,591 A * | 5/1967 | Cleverly | ................. | B28B 11/00 156/297 |
| 3,484,514 A * | 12/1969 | Longinotti | .............. | B28B 1/008 264/163 |
| 3,885,900 A * | 5/1975 | Kanta | ................. | B28B 13/0215 164/264 |
| 4,832,995 A * | 5/1989 | McLauchlin | ........... | B28B 11/00 156/269 |
| 6,213,754 B1 * | 4/2001 | Doty | ....................... | C04B 16/08 249/112 |
| 6,343,715 B1 * | 2/2002 | Wolfrom | ............... | B28B 13/023 141/284 |
| 6,391,236 B1 * | 5/2002 | Franceschini | ......... | B28B 13/022 264/112 |
| 6,461,565 B2 * | 10/2002 | Tokuhara | .................. | B22F 3/02 419/28 |
| 8,562,327 B2 * | 10/2013 | LaCroix | ................ | B28B 13/023 425/217 |

(Continued)

OTHER PUBLICATIONS

Machine to be improved: Multimat RH 2000. Manufactured by Hess Group http://www.topwerk.com/en/hess-group/products/concrete-block-machines/multimat-rh-2000/.

*Primary Examiner* — Joseph S Del Sole
*Assistant Examiner* — Emmanuel S Luk
(74) *Attorney, Agent, or Firm* — Sanchelima & Associates, P.A.; Jesus Sanchelima, Esq.; Christian Sanchelima, Esq.

(57) ABSTRACT

A product leveling device mounted to the front of a feeder box of a tile machine. The device includes a scraper mechanism with a plate having an edge to manufacture tile products of predetermined dimensions from material contained in a lower mold. A production board cooperates with the lower mold to receive the material. The thickness of the tile product can be selectively reduced without affecting the structure of the tile machine. Optionally, fingers can be added to the edge to form longitudinally channels in the material. Shoes are mounted to the end of the tamper head that coact with the material, including any channels, to produce a uniform pressure to the material.

4 Claims, 13 Drawing Sheets

(56) References Cited

U.S. PATENT DOCUMENTS

| | | | | |
|---|---|---|---|---|
| 8,568,129 B2* | 10/2013 | LaCroix | ................ | B28B 7/0041 425/219 |
| 9,205,620 B2* | 12/2015 | Andersson | ............ | B29C 44/388 |
| 9,945,118 B2* | 4/2018 | Matys | .................... | B28B 7/007 |
| 2002/0011680 A1* | 1/2002 | Prodi | .................. | B28B 13/0215 264/37.29 |
| 2003/0006521 A1* | 1/2003 | Rivola | .................. | B28B 13/023 264/101 |
| 2003/0006525 A1* | 1/2003 | Rivola | .................. | B28B 13/023 264/139 |
| 2005/0066955 A1* | 3/2005 | Pedrini | .................. | B23D 47/04 125/12 |
| 2007/0090573 A1* | 4/2007 | Correia | .................. | B28B 7/007 264/333 |
| 2008/0032050 A1* | 2/2008 | Yoon | ....................... | B28B 1/005 427/385.5 |
| 2009/0315216 A1* | 12/2009 | Milot | ....................... | B28B 7/06 264/313 |
| 2010/0007051 A1 | 1/2010 | Ness et al. | | |
| 2014/0141961 A1* | 5/2014 | Koszo | ...................... | B28B 3/02 501/155 |

\* cited by examiner

PRODUCT LEVELING DEVICE FOR TILE MACHINES

BACKGROUND OF THE INVENTION

1. Field of the Invention

The present invention relates to tile machines and, more particularly, to a tile product leveling device used with these machines. For the purposes of the present application the word "product" or "tile product" includes cement and concrete tiles, blocks, and pavers.

2. Description of the Related Art

Several designs for paver and concrete machines have been designed in the past. None of them, however, include a product leveling device capable of creating tiles with varying heights greater than 3 mm, the height of the most aggressive textured surface. Also, none of them include a product leveling device capable of producing tile products thinner than approximately 10 mm. Yet, this device is not used in the applications of texture, but rather for the structural design of the product.

The present invention overcomes difficulties in manufacturing thin products with or without aggressive changes in the levels of the title products, which are desirable to obtain interlocking structural features. This requires the application of substantially uniform pressure to the cementitious material in the bottom mold. Therefore, for the creation of channels or different levels in a tile product it is necessary to remove through a scraping process predetermined amounts of material resulting in channels of different levels that will secure cooperative shoes mounted to the tamper head used in tile machines. At present, tile machines are limited to cosmetic designs alterations of the tile product surface. The most aggressive texture patterns do not exceed the creation of channels or levels of 10 mm maximum. The shoes with designs above this limit can not apply a uniform pressure to the entire tile product in the mold, resulting in an unsuitable product. The present invention solves this problem and allows a user to introduce more aggressive patterns that impact structural characteristics of the product.

Applicant believes that a related reference corresponds to U.S. Patent Publication No. 2010/0007051A1 filed by Ness Inventions, Inc. for a "Concrete Block Machine Having a Controllable Cutoff Bar". However, it differs from the present invention because Ness' machine lacks the ability to make longitudinal channels on the concrete product with different depths. For example, Ness' machine will not be able to manufacture the tile disclosed in U.S. Pat. No. 9,663,954.

Another related reference is the publication of the specifications for the concrete block machine model No. Multimat RH 2000-3 MVA manufactured by Hess Group. However, the published literature lacks any description of the features of the scraper mechanism claimed herein. The present invention adds an improvement to this, and other similar machines, for the manufacturer of tiles with longitudinal channels of different depths or levels.

In the manufacture of concrete tiles, blocks and pavers, a compression pressure is applied to the concrete material in the molds. It is desirable that the pressure be applied uniformly to the entire tile, block, or paver being made. Uniform compression generally renders a consistently strong and more reliable product. When the tile, block, or paver includes channels that extend longitudinally, the mold's shoe contains cooperating negatives of said channels through which pressure is delivered to the material in the mold. A problem occurs because the material in the mold has a level surface, which does not account for the pronounced negatives. When the shoe contacts the mold and force is applied, the portions of the shoe containing the pronounced negatives transmit greater pressure to the area directly below the cooperating negatives than to other parts of the product. This causes a product that is only properly compacted below the protruding negatives, and wholly uncompacted everywhere else in the product. The present invention resolves the problem by longitudinally scraping excess material from the area directly below the shoe's cooperating negative, and moving it back into the filler box for later use.

Also in the manufacture of product, when a tile, block, or paver with a height below of 10 mm is desired, mechanical constraints within today's technology prevent the table, a vital component of tile machines, from lowering below 10 mm thus preventing desired production. Choosing to ignore the machine manufacturer's warnings about surpassing the 10 mm minimum level, results in crushing vital components below the table and thus rendering the machine wholly inoperable. The present invention resolves this problem by allowing the table to maintain itself at a safe height while lowering only the bottom mold to the desired thinness and preventing mix loss through the present invention's components described herein.

Other documents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a product leveling device for concrete tile and paver machines that allows a user to selectively inscribe longitudinal channels or different levels on a cement-based product with different depths to produce different tile designs. When used in conjunction with cooperating mold shoes mounted to the tamper head. The shoe has protruding channels that cooperatively match the dimensions of the channels that were scraped or removed from the material in the mold cavities.

It is still another object of the present invention to provide a product level device for tile machines that coact with mold shoes to maintain a substantially uniform molding pressure on the entire product.

It is another object of this invention to provide a scraper mechanism for concrete tile and paver machines that can be readily adjusted for different depths, while maintaining the compression of the material in the molds substantially uniform.

Still another object of the invention is to recapture in the feeder box the material removed with the scraper plate.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
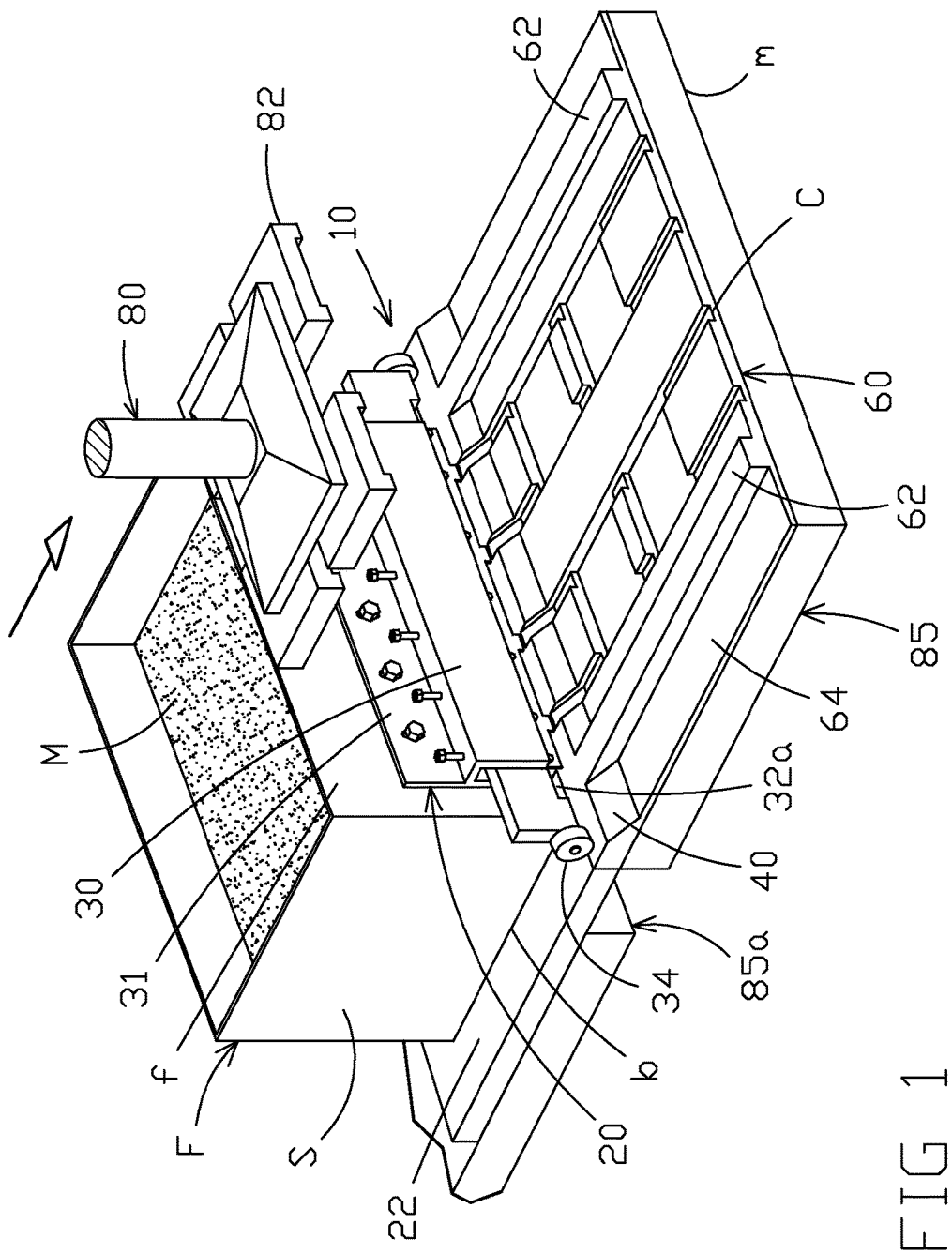
FIG. 1 represents an isometric view of a feeder box F typically found in concrete tile machines with product leveling device 10 mounted thereon. Feeder box F is at the starting portion in this figure.

Referring now to the drawings, where the present invention, a product leveling device that is generally referred to with numeral 10, and it can be observed that it basically includes scraper mechanism 20 mounted to the front of a tile machine that includes a feeder box F moving longitudinally between two extreme positions for depositing a predetermined amount of material M in a bottom mold 60. The machine also includes a tamper head 80 and shoe members 82 that cooperatively coact with the channels C created on the deposited material M in bottom mold 60. Shoes 82 have cooperative dimensions to coact with the channels' dimensions so that a substantially uniform pressure is applied throughout material M. Feeder box F includes a front f, two sides S and a bottom b. Adjacent to sides S there is a flat surface 22 that extends perpendicularly from sides S.

Figure 9:
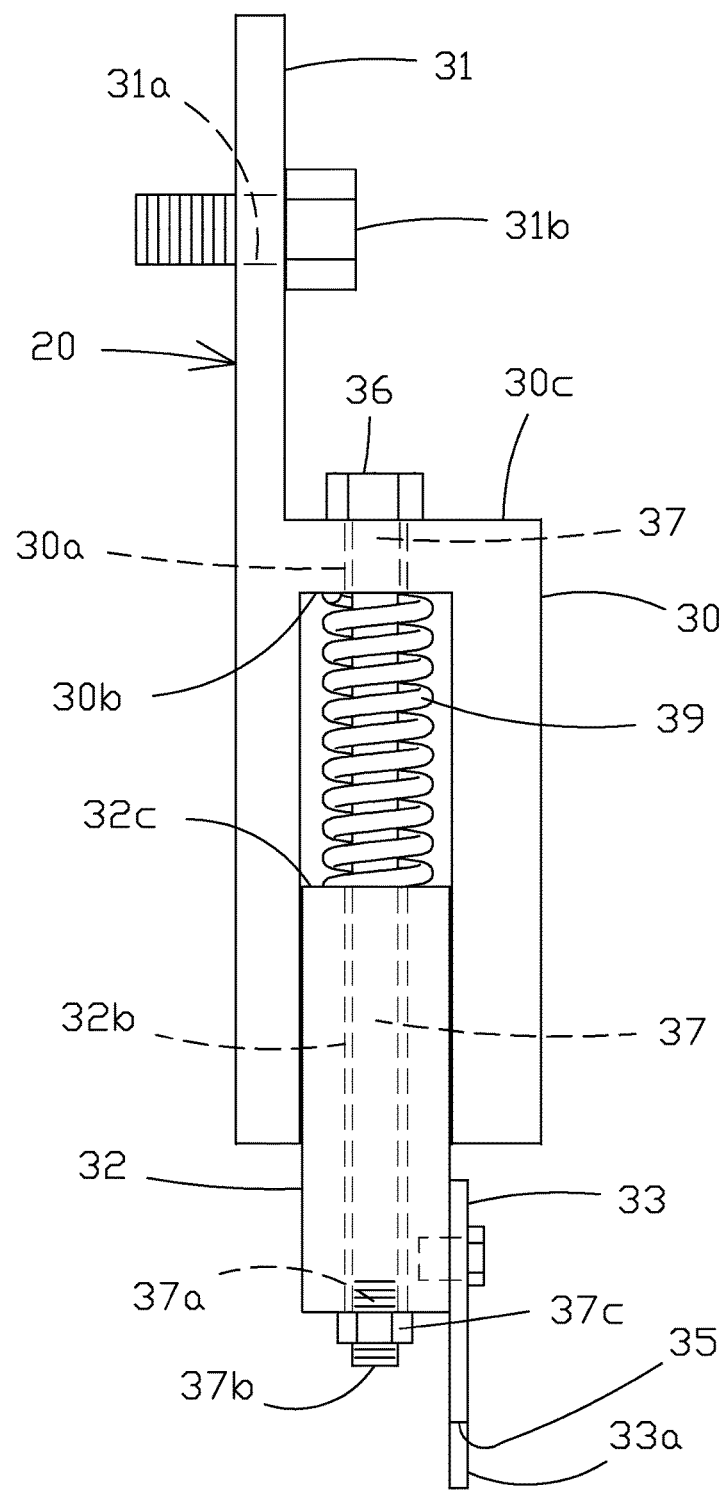
FIG. 9 is a side elevational view of an embodiment for scraper mechanism 20 showing housing 30 and bolt 37 in phantom.
Figure 10:
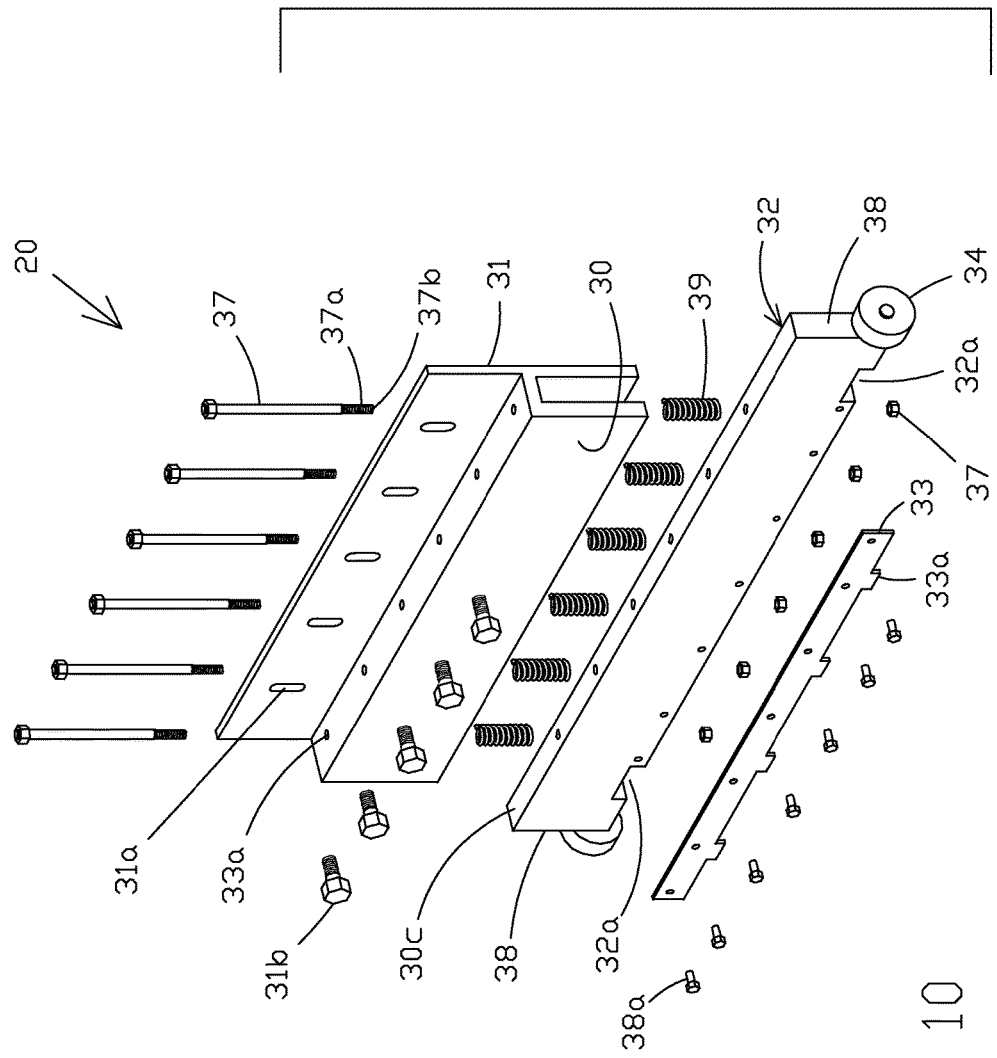
FIG. 10 is an exploded view of device 20 as seen from the front and above.

Scraper mechanism 20 includes housing 30 that has a C-shape cross-section and extends longitudinally a predetermined distance and, in the embodiment shown herein, also includes mounting plate 31 rigidly extending from housing 30 and cooperatively adapted to secure housing 30 to the front f of feeder box F, as best seen in FIGS. 1 through 4. Mounting plate 31 includes through openings 31a and bolt 31b to mount plate 31 to the front of feeder box F, as best seen in FIG. 9.

Figure 5:
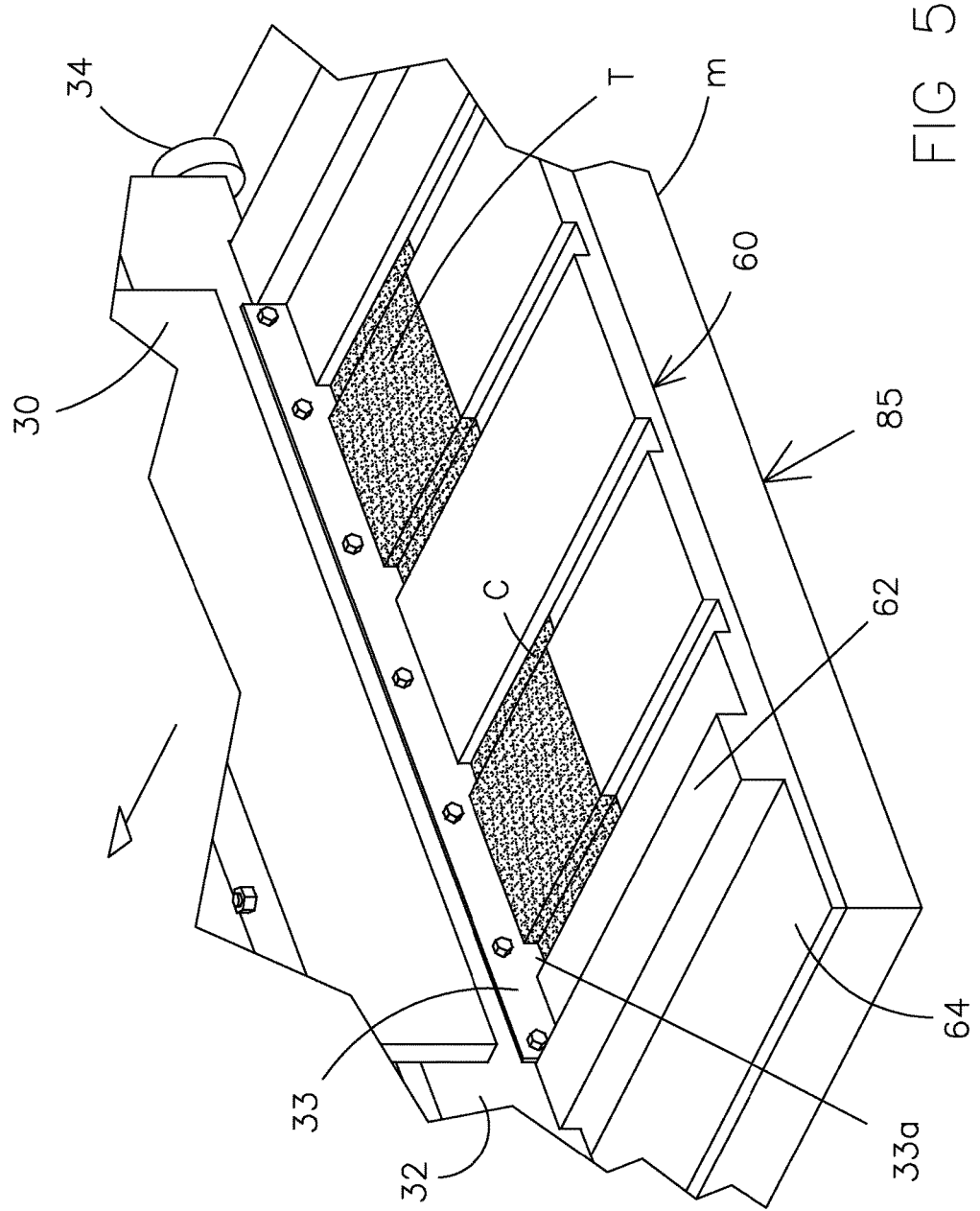
FIG. 5 is an enlarged partial isometric view of device 10 showing scraper plate 33 and finger 33a leveling material M and forming channels C in the resulting product. Feeder box F and device 10 are traveling back to the original position while leveling and scraping material M.
Figure 6:
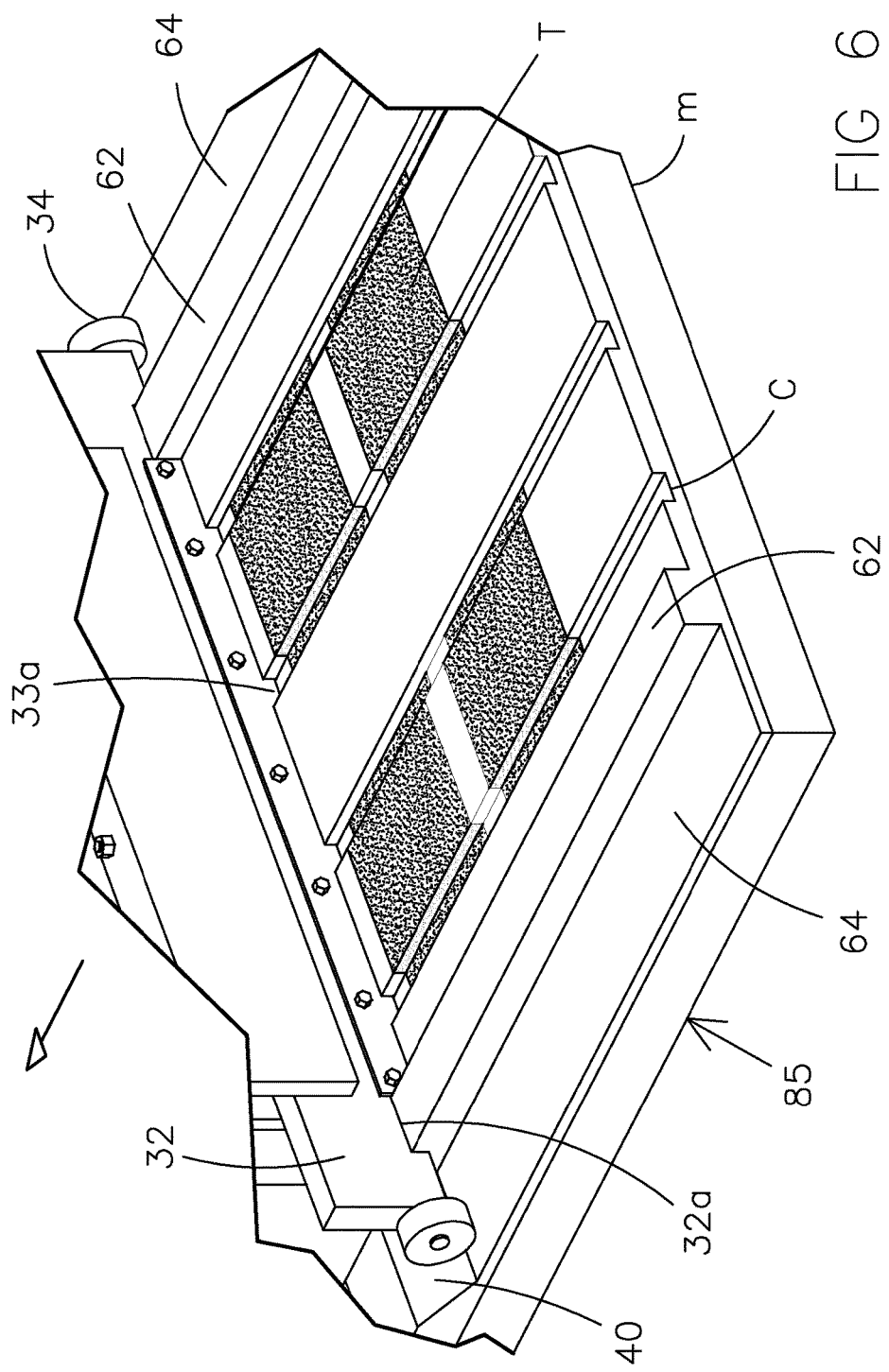
FIG. 6 is similar to FIG. 5 after device 10 advanced more towards its initial position.

As seen in FIGS. 5 and 6, scraper bar 32 is partially received within housing 30 and kept in place with screws 38a. Bar 32 extends beyond housing 30 a predetermined distance and includes two ends 38 where wheels 34 are rotably mounted. Bar 32 includes an underside with cutouts 32a positioned at a predetermined distance from the ends. Cutouts 32a cooperate with guiding and supporting rails 62 integrally built to, and outwardly extending from, bottom mold 60, as best seen in FIGS. 1 through 6. Bar 32 also includes through bores 32b that permits the shank of bolts 37 to pass through exposing threaded portion 37a to mate with nuts 37c. Bolts 37 also pass through through holes 30a and through springs 39 that are sandwiched between the underside 30b of wall 30c and upper side 32c of bar 32, urging the latter downwardly. Rails 62 slidably support feeder box F when the latter travels over the former. In the expanded state of spring 39, bolt head 36 coacts with housing 30 preventing any further movements as seen in FIG. 9. Distal end 37b does not protrude beyond scraper fingers 33a and receives nuts 37c.

Figure 2:
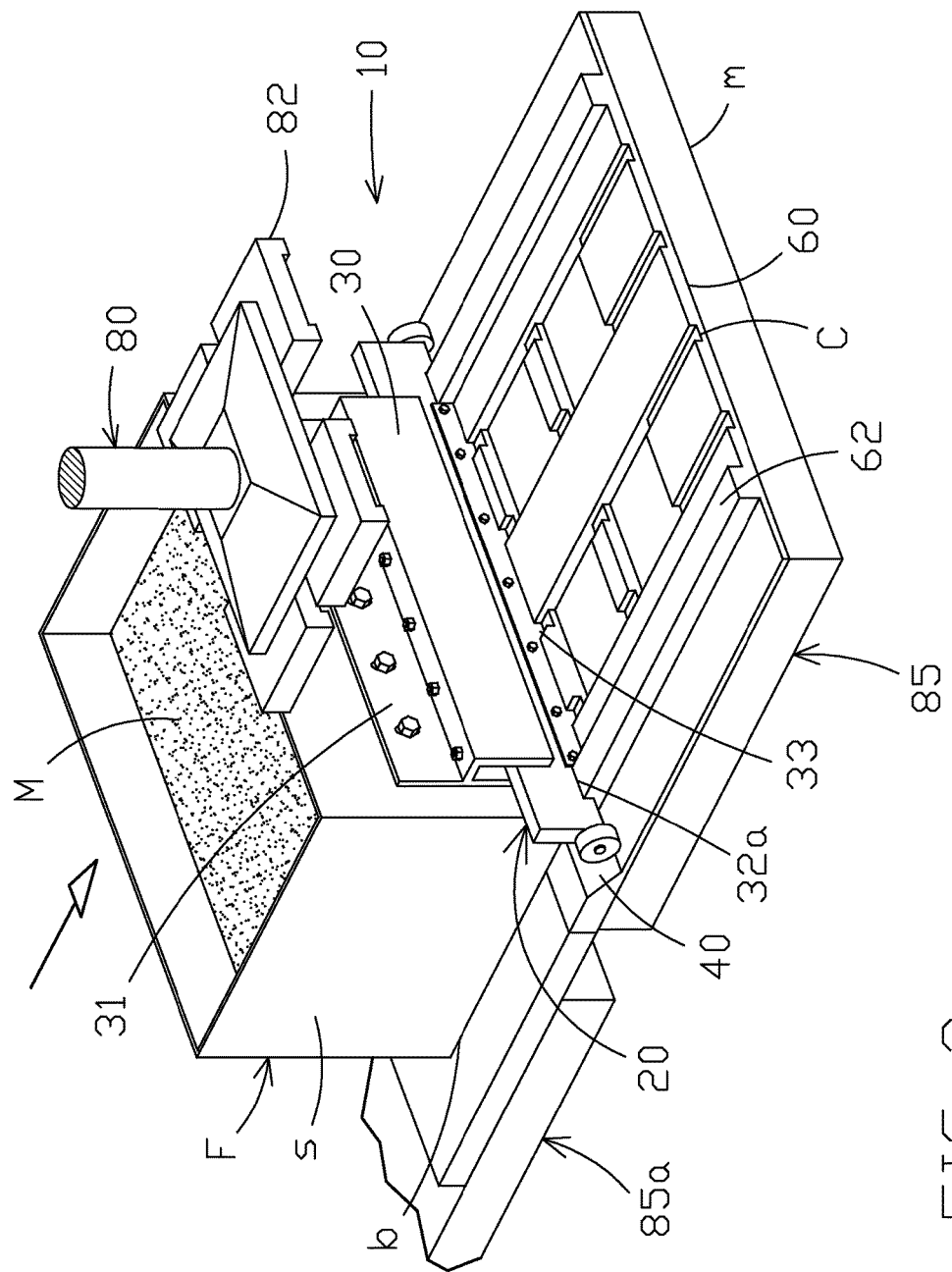
FIG. 2 shows a view similar to the one depicted in FIG. 1 except that feeder box F has moved longitudinally over mold 60 and material M is about to be deposited in bottom mold 60.
Figure 3:
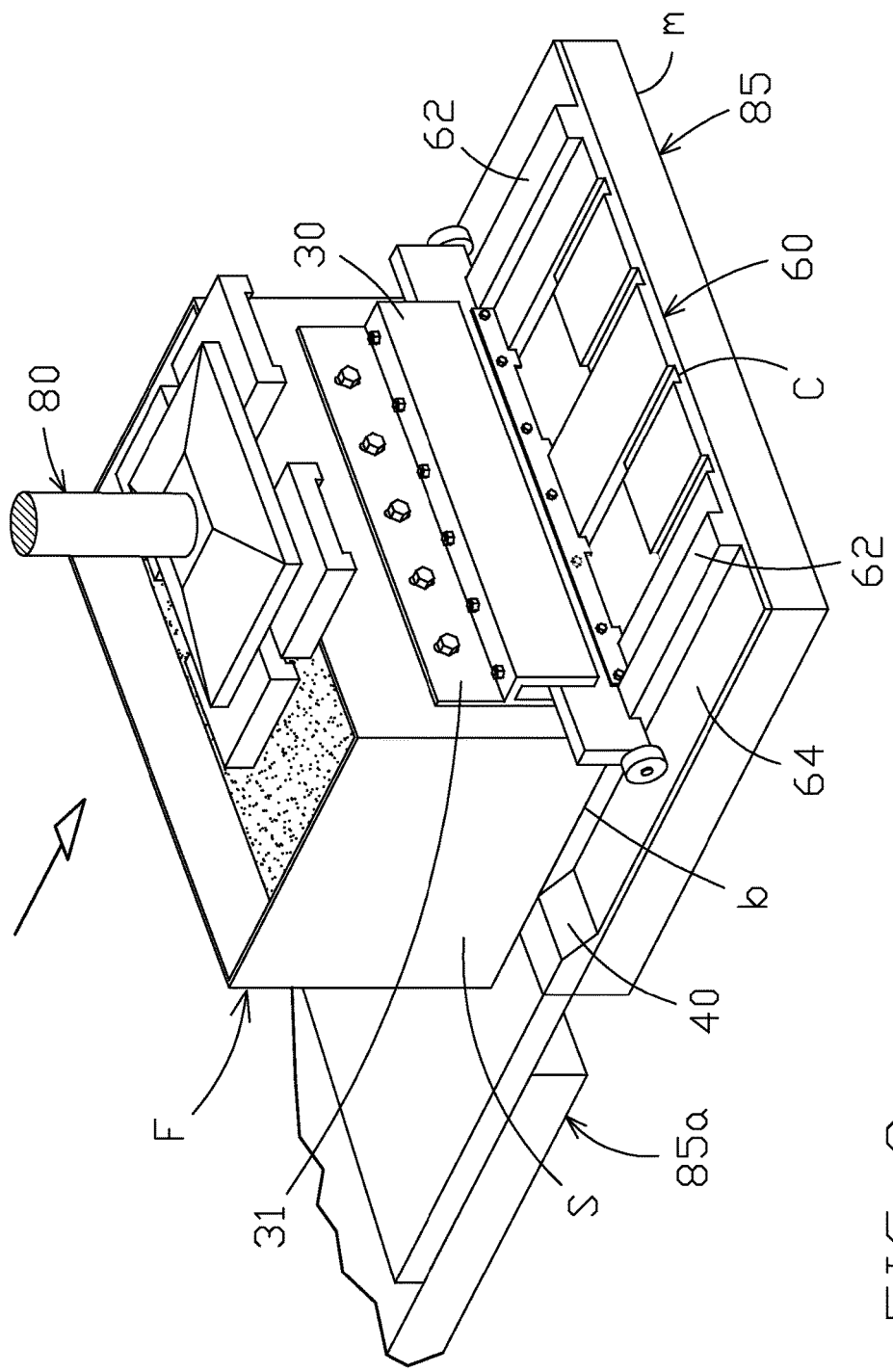
FIG. 3 shows another view similar to the previous two figures except that feeder box F has traveled further inside bottom mold 60 and material M is being deposited therein.
Figure 4:
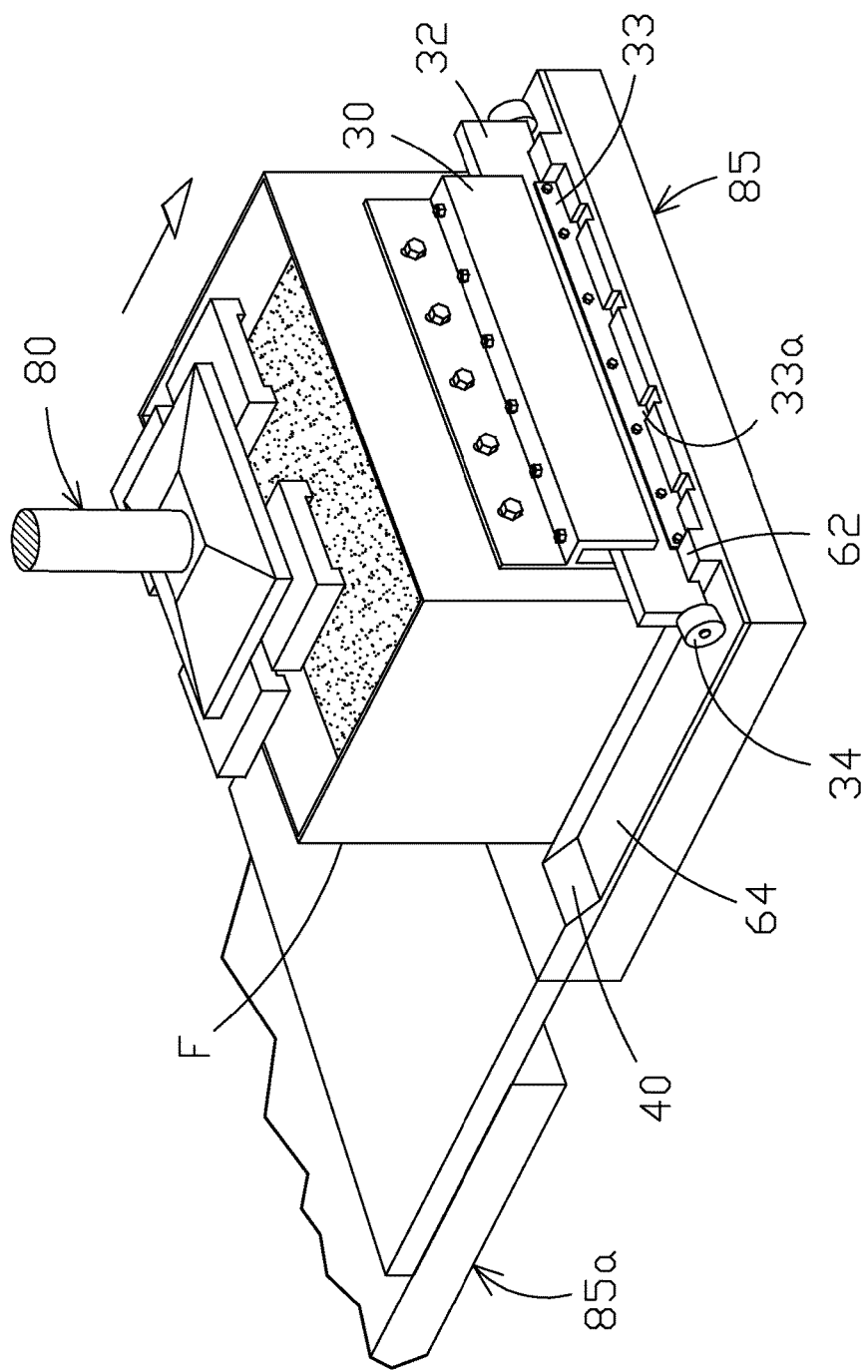
FIG. 4 shows another view similar to the previous three figures except that feeder box F has reached the end of bottom mold 60 which is now filled with material M.
Figure 7:
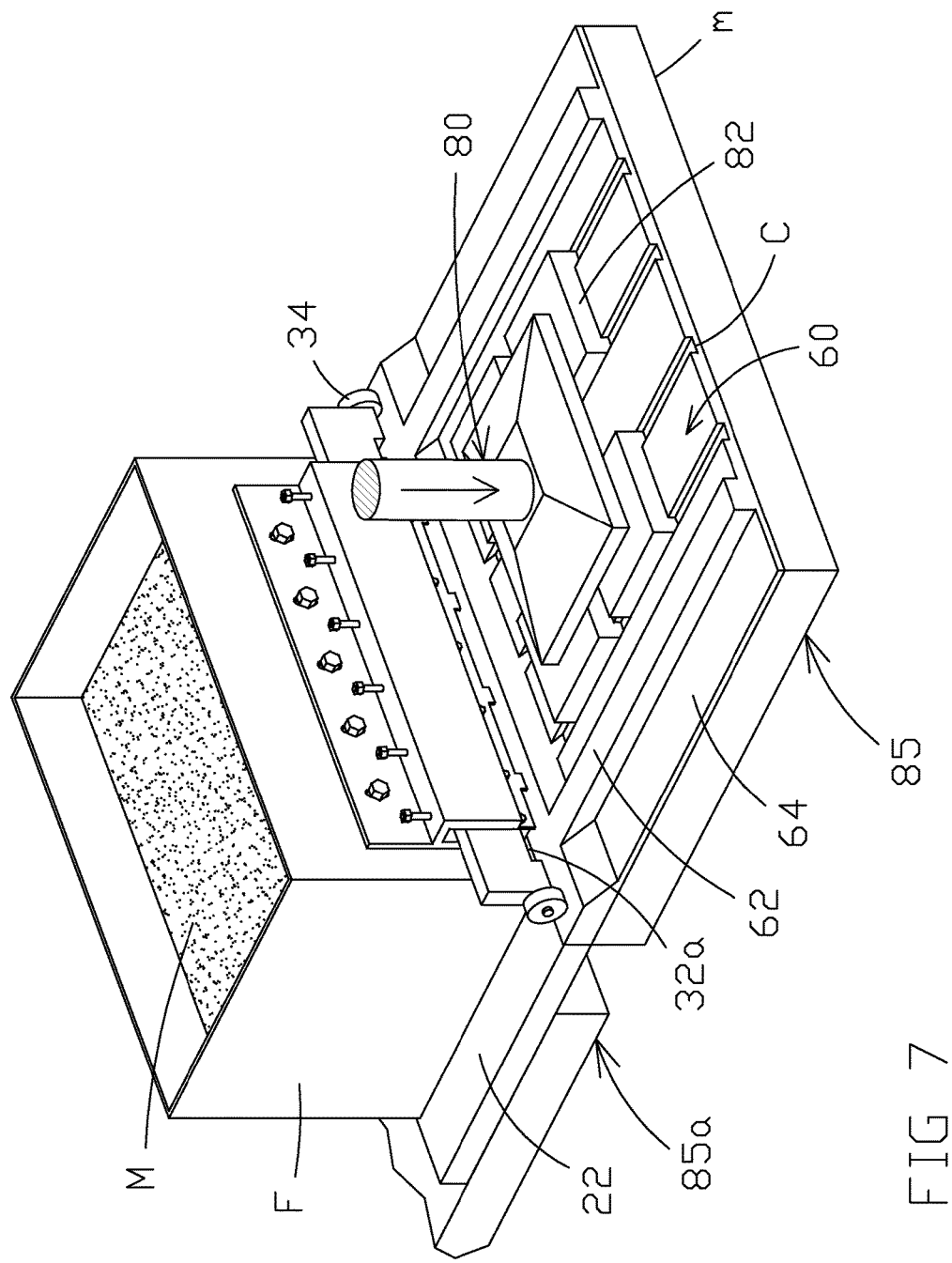
FIG. 7 shows feeder box F at its initial position with tamper 80 lowered and applying a uniform pressure to material M through shoes 82.
Figure 8:
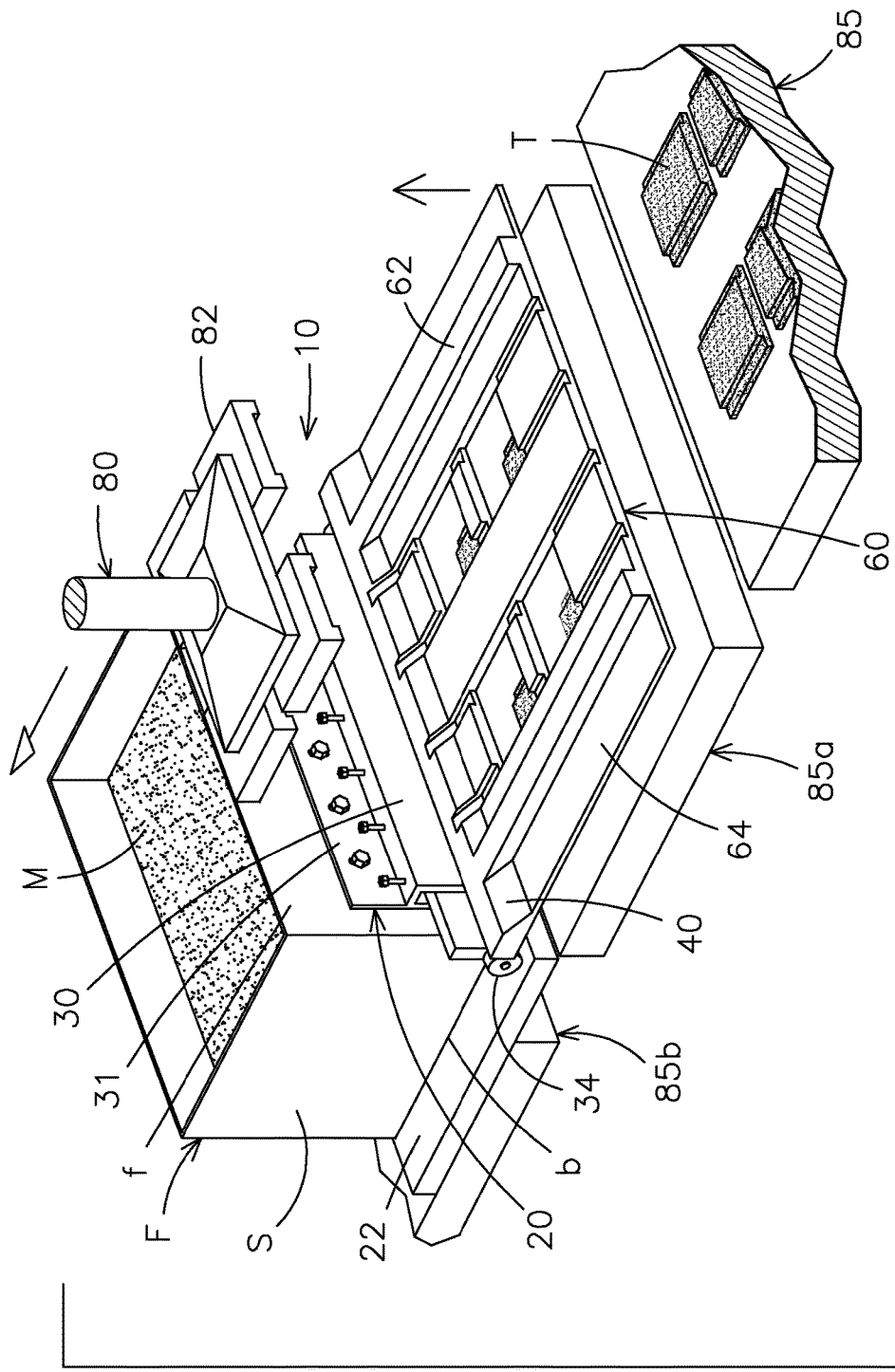
FIG. 8 is similar to the previous figure except that mold 60 and tamper 80 have been lifted with production table 85 advanced with product tile T formed.
Figure 8A:
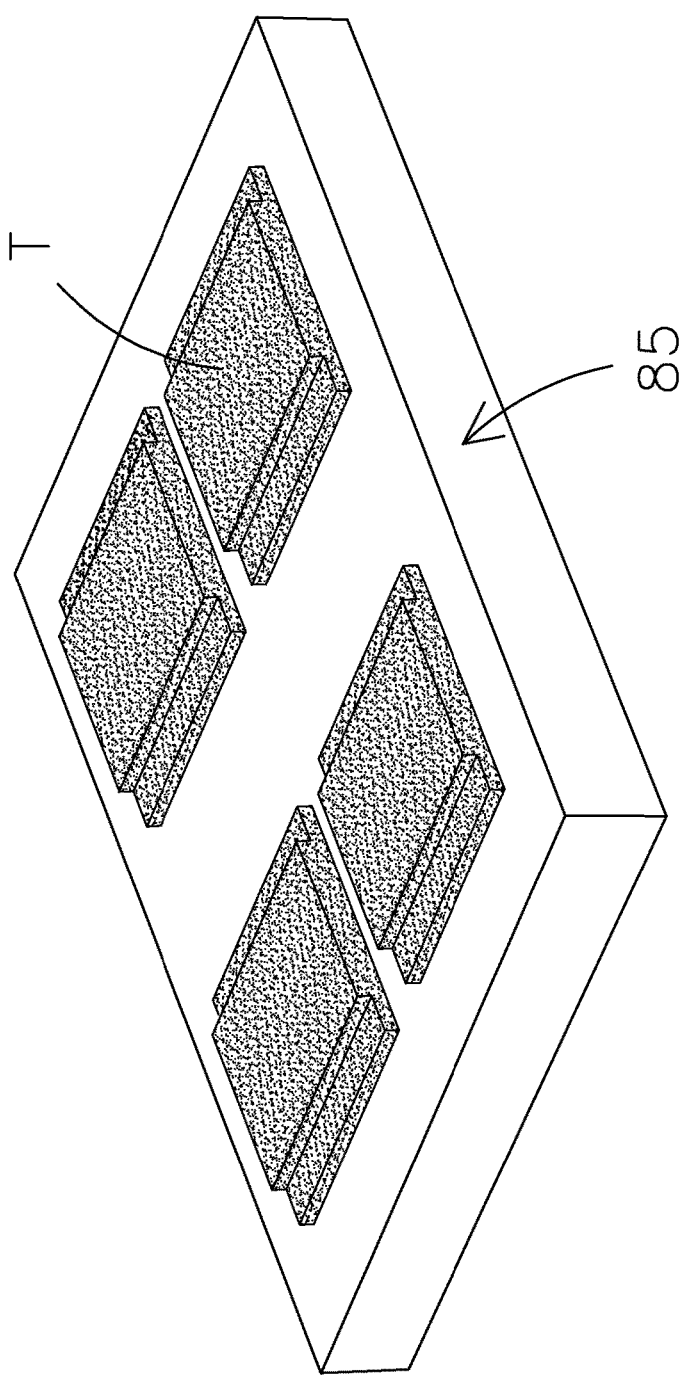
FIG. 8A is an isometric view of production board 85 supporting finished tile T.
Figure 11:
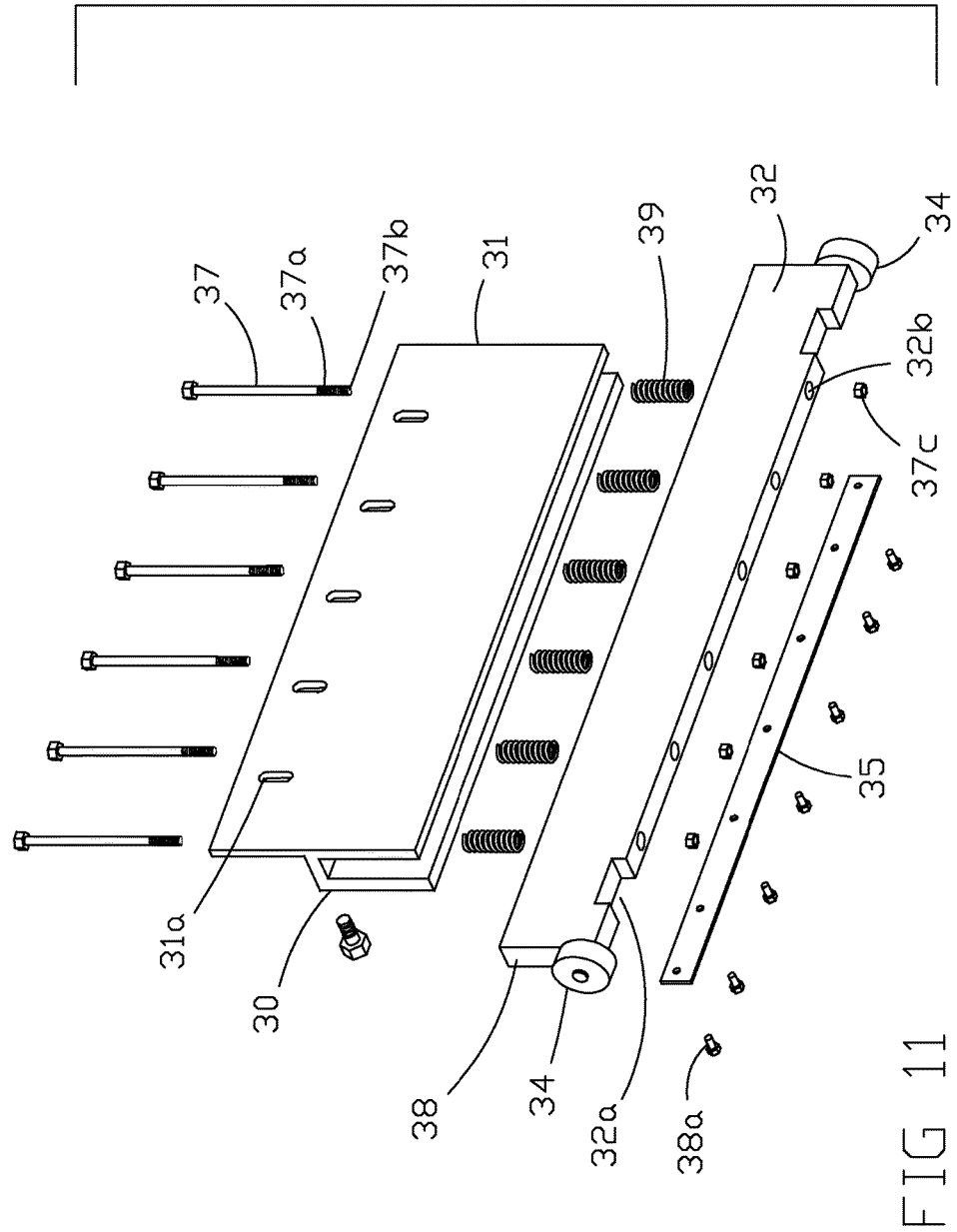
FIG. 11 is an exploded view of device 20 as seen from the rear and below. Edge 35 in their embodiment lacks any fingers 33a so the resulting tile T would not have multiple levels.
Figure 12:
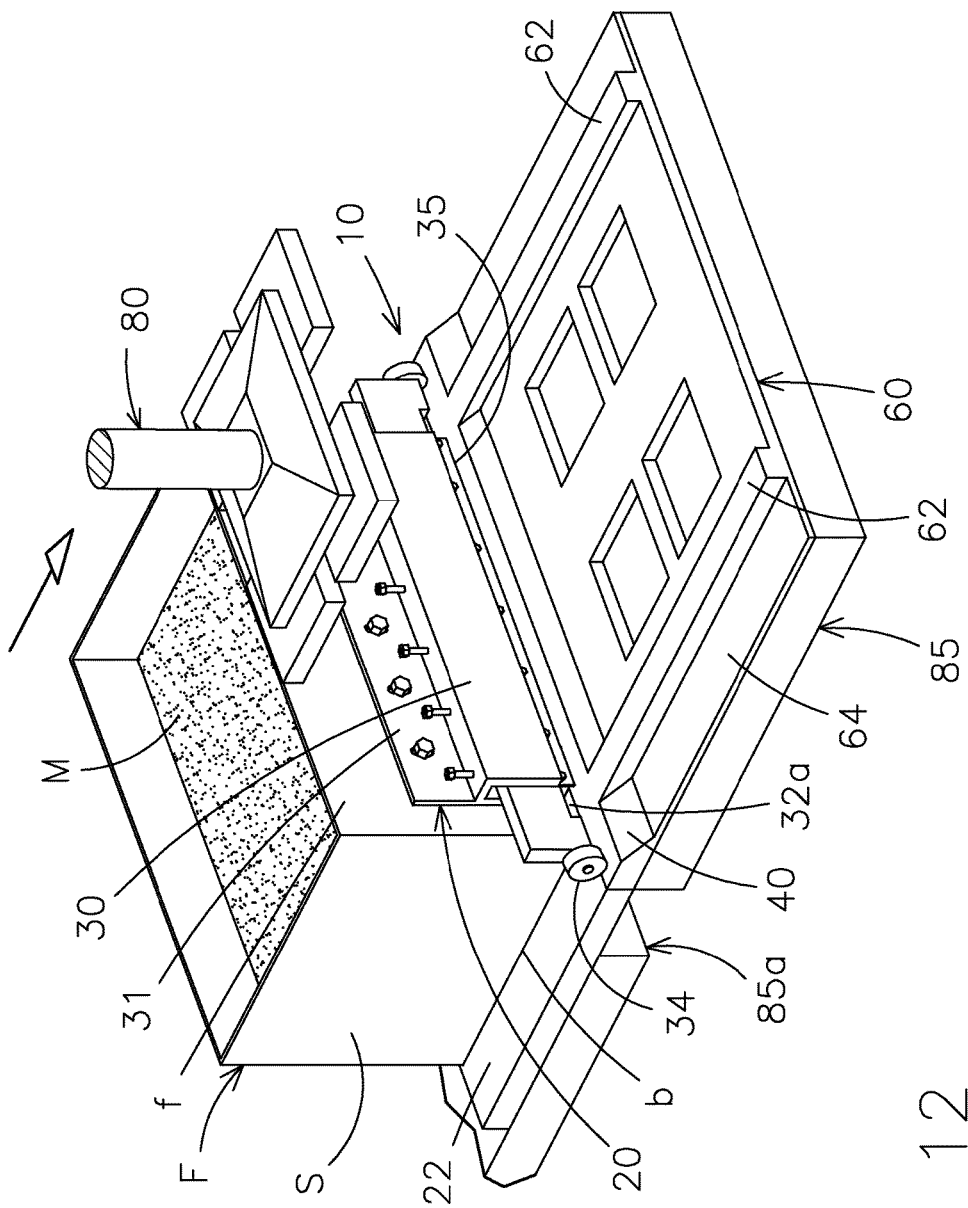
FIG. 12 is an isometric view similar to FIG. 1 with a uniform edge (without fingers 33a.)

In operation feeder box F starts at one position with wheels 34 resting on flat surface 22, as shown on FIG. 1, and spring 39 is compressed inside housing 30. It can be seen that bolts 37 protrude outwardly (upwardly) in FIG. 1. In FIG. 2, wheels 34 have passed ramp 40 and spring 39 has expanded, forcing bar 32 downwardly, since housing 30 stays at the same relative position with respect to feeder box F to which it is rigidly mounted. Wheels 34 are now supported by side flat surfaces 64 extending from the sides of bottom mold 60 at a lower plane. In FIG. 3, feeder box F continues to advance depositing material M on lower mold m. Once feeder box F reaches the extreme position shown in FIG. 4 at the end of mold m, fingers 33a are ready to start making the longitudinal channels, as feeder box F starts traveling back to its initial position. FIG. 5 is an enlarged partial view of scraper assembly 20 showing fingers 33a coacting with material M and creating longitudinal channels C in material M. Similarly, FIG. 6 shows bar 32 further advanced with another pair of the tile product shaped. Excess material M is being pushed back into feeder box F as it travels back. In FIG. 7, tamper assembly 80 comes down causing a certain amount of pressure to be applied to material M through shoes 82 with complementing dimensions to the channels or levels created on material M. This pressure is uniformly applied. FIG. 8 shows tamper assembly 80 lifted as well as lower mold 60, away from production board 85. Production board 85 moved forward and production board 85a took its place. Another board 85b advances below feeder box F. It can be seen in FIG. 8 that production boards 85, 85a and 85b move in a conveyor (not shown) in the same plane. Optionally, edge 35 of scraper plate 33 can be uniform resulting in only one level being made on material M, as seen in FIGS. 11 and 12.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. A product leveling device for tile machines, comprising:

A) a tile machine having a feeder box adapted to move between first and second extreme positions in a horizontal plane including a front, two sides, and a bottom and further including a bottom mold with a production board below the latter for receiving material from said feeder box at the first extreme position and a tamper head including shoes coacting with the material in said bottom mold when said feeder box is at the second extreme position;

B) first and second longitudinal coplanar paths kept at a spaced apart and parallel relationship and positioned adjacent to the sides of said feeder box at a first plane below the bottom of said feeder box and said first and second longitudinal coplanar paths including each a front end;

C) third and fourth longitudinal coplanar paths kept at a parallel spaced apart relationship with respect to each other and extending aligned with said first and second paths, respectively, at a second plane located at a predetermined distance below said first plane and as a continuation of said first and second paths and the position of said third and fourth paths being separated from the projection of said first and second paths by a predetermined distance;

D) at least two rails extending at a parallel and spaced apart relationship with respect to each other, said rails are positioned along the feeder box path of said feeder box to cooperatively support the latter when positioned above said bottom mold;

E) first and second ramps mounted on said third and fourth coplanar paths and connecting said first and third paths and said second and fourth paths respectively wherein each of said first and second ramps includes a rear end with respective first and second upper surfaces coplanar with said first and second paths extending a predetermined distance and further including first and second slanted surfaces ending on said third and fourth paths; and F) a scraper device including a housing mounted to the front of said feeder box and having a spring biased scraper plate with an edge that is urged downwardly against the material in said bottom mold and said scraper device including a wheel assembly coining in contact relationship with said first, second, third and fourth paths and said first and second slanted surfaces thereby causing said scraper plate to move between two extreme vertical positions and removing excess material over said lower mold as said device moves from said first extreme position to said second extreme position.

2. The device set forth in claim 1 wherein said edge has a predetermined contour defining at least one finger to coact with the material in said bottom mold to create at least one longitudinal channel.

3. The device set forth in claim 2 wherein said scraper plate includes at least one cutoff for cooperatively coacting with said at least two rails to guide said scraper device.

4. The device set forth in claim 3 wherein said excess material is pushed back into said feeder box by said scraper device.

* * * * *